(12) United States Patent
Anderson et al.

(10) Patent No.: US 7,054,093 B1
(45) Date of Patent: May 30, 2006

(54) DUAL ACTUATORS FOR READ-WHILE-WRITE RECORDING SYSTEM

(75) Inventors: James S. Anderson, Hugo, MN (US); Denis J. Langlois, River Falls, WI (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 11/012,795

(22) Filed: Dec. 14, 2004

(51) Int. Cl.
*G11B 21/02* (2006.01)

(52) U.S. Cl. ..................... 360/75; 360/78.02

(58) Field of Classification Search ............. 360/251.1, 360/261.1
See application file for complete search history.

(56) References Cited

U.S. PATENT DOCUMENTS

| | | | | |
|---|---|---|---|---|
| 5,432,652 | A * | 7/1995 | Comeaux et al. | 360/77.12 |
| 6,081,402 | A * | 6/2000 | Cho | 360/77.04 |
| 6,771,456 | B1 * | 8/2004 | Winarski et al. | 360/78.02 |
| 2003/0227702 | A1 * | 12/2003 | Watson et al. | 360/53 |
| 2005/0122623 | A1 * | 6/2005 | Dee | 360/129 |

* cited by examiner

*Primary Examiner*—K. Wong
(74) *Attorney, Agent, or Firm*—Eric D. Levinson

(57) ABSTRACT

The invention provides a read-while-write recording system for a linear data storage medium, such as magnetic tape or other data storage medium in which data is stored on parallel data tracks that extend along a length of the medium. The invention makes use of separate sliders for the read and write elements, and separate actuators to control the positioning of the sliders. Each of the sliders may also include servo elements to read servo marks. In this manner, the write elements of a first slider can be positioned independently from the read elements of a second slider in order to achieve improved head positioning with respect to data tracks on the linear data storage medium.

20 Claims, 7 Drawing Sheets

DUAL ACTUATORS FOR READ-WHILE-WRITE RECORDING SYSTEM

TECHNICAL FIELD

The invention relates to linear data storage media such as magnetic tape and, more particularly, to heads for reading and writing data to linear data storage media.

BACKGROUND

Linear data storage media refers to data storage media, such as magnetic tape, in which data is stored in parallel tracks that extend linearly along the length of the media. Examples of linear data storage media include magnetic tape, magneto-optic tape, optical tape, holographic tape, and possibly other tape-like media formats. Magnetic tape media remains an economical medium for storing large amounts of data. For example, magnetic tape cartridges, or large spools of magnetic tape are often used to back up large amounts of data for large computing centers. Magnetic tape cartridges also find application in the backup of data stored on smaller computers such as workstations, desktop or laptop computers.

In magnetic tape, data is typically stored as magnetic signals that are magnetically recorded on the medium surface. The data stored on the magnetic tape is often organized along data tracks, and read/write heads are positioned relative to the data tracks to write data to the tracks or to read data from the tracks. As the number of data tracks increases, the data storage capacity of the magnetic tape likewise increases. However, as the number of data tracks increases, the tracks become narrower and more crowded on the surface of the data storage tape. Servo tracks are also commonly defined on magnetic media to provide reference points for tracking the location of data tracks. Servo tracks can improve the ability to locate data tracks, particularly as the tracks become narrower and more crowded on the surface of the data storage tape.

A wide variety of heads have been designed to write data to magnetic tape. Various heads have also been designed to read data stored on magnetic tape. A magnetic data tape recording system often includes both write heads and read heads to facilitate the writing of information to the magnetic medium and readout of such information for verification that the data was written properly. Read-while-write sliders, for example, typically include a read head and a write head precisely mounted on a slider to facilitate readout and verification of data written by the write head.

SUMMARY

In general, the invention provides a read-while-write recording system for a linear data storage medium, such as magnetic tape or other data storage medium in which data is stored on parallel data tracks that extend along a length of the medium. The invention makes use of separate sliders for the read and write elements, and separate actuators to control the positioning of the sliders. Each of the sliders may also include servo elements to read servo marks. In this manner, the write elements of a first slider can be positioned independently from the read elements of a second slider in order to achieve improved head positioning with respect to data tracks on the linear data storage medium. The invention can avoid problems with conventional read-while-write sliders that include both the read and write elements. These problems generally manifest in the conventional sliders at very small track pitches, such as track pitches less than 5 microns, less than 2 microns and especially less than 1 micron.

In one embodiment, the invention provides a read-while-write recording system for a linear data storage medium comprising a first slider including a write element to write data to the linear data storage medium, and a first servo element to read servo marks from the linear data storage medium. A first actuator defines positioning of the first slider. The system also includes a second slider including a read element to read the data written by the write element, and a second servo element to read the servo marks from the linear data storage medium. A second actuator defines positioning of the second slider.

In another embodiment, the invention provides a read-while-write recording system for magnetic data storage tape comprising a first slider including a first write element to write data to the magnetic tape in a first tape direction, a first read element to read data from the magnetic tape in a second tape direction, and a first servo element to read servo marks from the magnetic tape. A first actuator defines positioning of the first slider. The system also includes a second slider including a second write element to write data to the magnetic tape in the second tape direction, a second read element to read data from the magnetic tape in the first tape direction, and a second servo element to read servo marks from the magnetic tape. A second actuator defines positioning of the second slider.

In another embodiment, the invention provides a method comprising writing data on a linear data storage medium via a write element on a first slider, verifying the data on the linear data storage medium via a read element on a second slider, positioning the write element of the first slider via a first actuator in response to servo signals detected by a first servo element on the first slider, and positioning the read element of the second slider via a second actuator in response to servo signals detected by a second servo element on the second slider.

The various embodiments of the invention may be capable of providing one or more advantages. Specifically, the invention can improve head to track alignment of read heads and write heads. By implementing separate sliders and separate actuators for the read and write heads, the invention can avoid problems with conventional read-while-write sliders that manifest at very small track pitches, such as track pitches less than 5 microns, less than 2 microns and especially less than 1 micron. In some embodiments, the invention can allow for bi-directional read-while-write capabilities with the improved head to track alignment.

Various bi-directional slider arrangements are disclosed, including an arrangement in which each slider includes both write elements and read elements. In that case, however, in accordance with the invention, the write elements of a given slider are used for writing in one direction and the read elements of the slider are used for verification in the other direction. Thus, in each direction, the set of read elements and write elements that are used reside on different sliders, which are controlled by different actuators. These embodiments having write elements and read elements on each slider can provide manufacturing advantages by allowing conventional manufacturing techniques to be used in the creation of the sliders that are used to implement the invention.

The details of one or more embodiments of the invention are set forth in the accompanying drawings and the descrip-

DETAILED DESCRIPTION

The invention provides a read-while-write recording system for a linear data storage medium. A linear data storage medium refers to a medium in which data is stored on parallel data tracks that extend along a length of the medium. Examples of linear data storage media include magnetic tape, magneto-optic tape, optical tape, holographic tape, and possibly other tape-like media formats. It is highly desirable to increase the data storage density of linear data storage medium, and this often entails reducing the track pitch between adjacent data tracks such that a larger number of data tracks can be recorded in a given area.

Conventional read-while-write systems for magnetic tape make use of sliders that include read elements and write elements. The read elements are precisely aligned with the write elements on the slider for every channel of the slider, such that for each channel, a write element can write data to magnetic tape and a read element can read the data to verify that it was properly recorded. The slider may also include a servo element to read servo marks of the medium. An actuator can position the slider in response to the detected servo signals in order to properly align the write and read elements with respect to data tracks of the magnetic tape.

As track pitches become smaller, however, it becomes increasingly more difficult to align the write elements with the read elements on a slider. At very small track pitches, such as track pitches less than 5 microns, alignment becomes particularly difficult. As track pitches become less than 2 micron or less than 1 micron, alignment of read elements with write elements on a slider may be extremely difficult, or even impossible, particularly for mass production. Very slight tilt of the slider can cause misalignment with respect to data tracks at these very small track pitches. Also, thermodynamics can cause expansion of the medium or the head, which can also cause misalignment problems at these small track pitches. Media stretching or width variations can further compound such problems.

Figure 1:
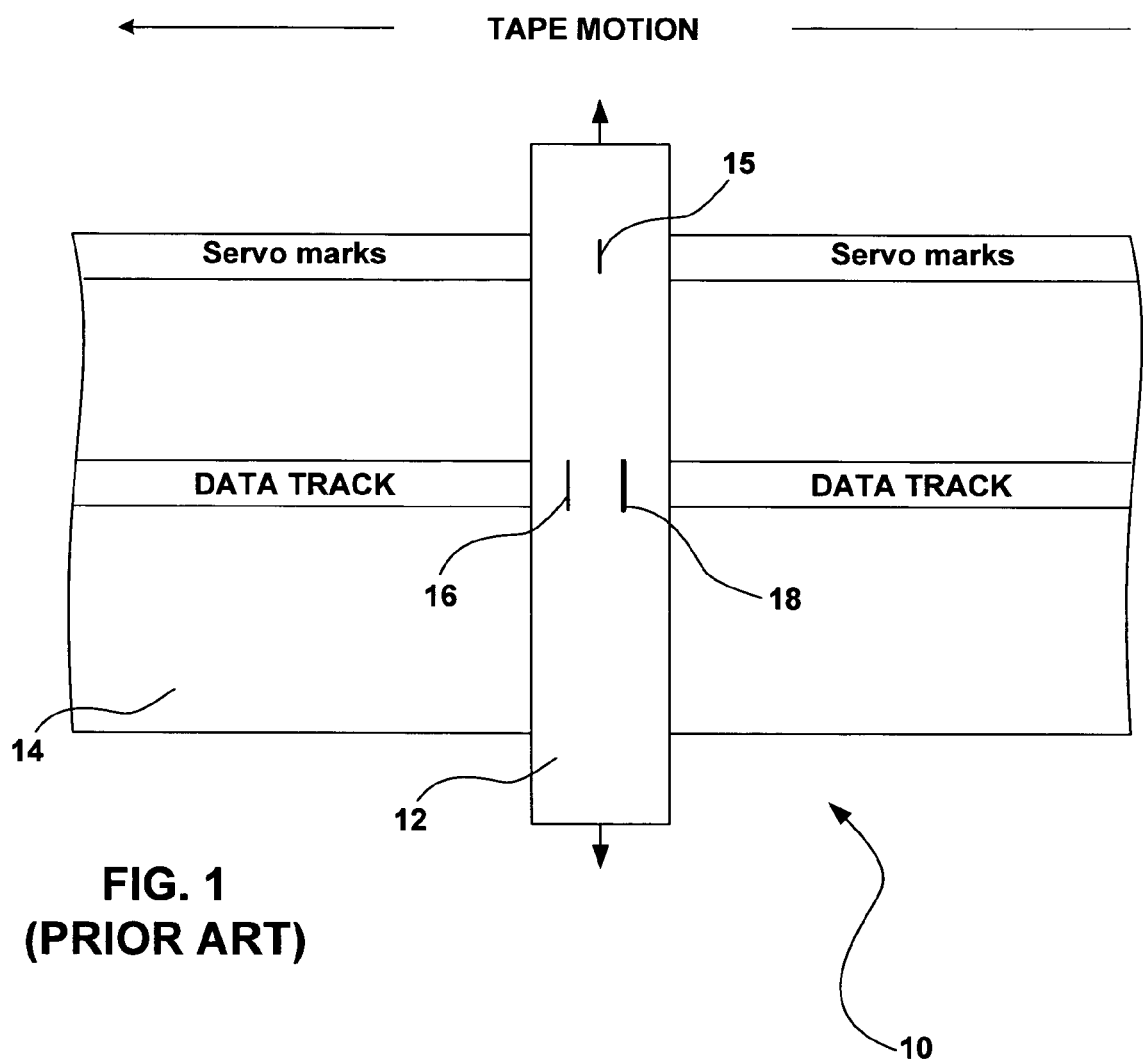
FIG. 1 is a conceptual diagram illustrating a conventional read-while-write slider positioned over a linear data storage medium.

In order to address these alignment concerns, the invention proposes the use of separate sliders for the read elements and the write elements of a read-while-write system. Separate servo tracking can then be performed for each slider, and each slider can be controlled by its own actuator. This avoids the need to precisely align the read element of a given channel with the write element of the given channel, as alignment of the write elements with respect to the data tracks can be performed by servo tracking of the first slider and alignment of the read elements with respect to the data tracks can be performed by servo tracking of the second slider FIG. 1 is a conceptual diagram illustrating a conventional system 10 comprising a conventional read-while-write slider 12 positioned over a linear data storage medium 14. A slider refers to a structure that includes one or more elements for reading or writing data to linear data storage media. Sliders can provide an air bearing surface or a contact surface that interfaces with a linear data storage medium, such as magnetic tape, to properly position read or write elements with respect to the medium surface.

Slider 12 of conventional read-while-write system 10 comprises a read element 16 and a write element 18. Importantly, read element 16 is precisely aligned with write element 18 on slider 12 such that write element 18 can write data to magnetic tape 14 and read element 16 can read the data to verify that it was properly recorded. Conventional slider 12 may also include a servo element 15 to read servo marks of magnetic tape. An actuator (not shown in FIG. 1) positions slider 12 in response to the detected servo signals in order to properly align write element 18 and read element 16 with respect to data tracks of the magnetic tape.

As mentioned above, however, as track pitches become smaller, it becomes increasingly more difficult to align the write elements with the read elements on a slider. In order to address these alignment concerns, the invention proposes the use of separate sliders for the read and write elements of a read-while-write system.

Figure 2:
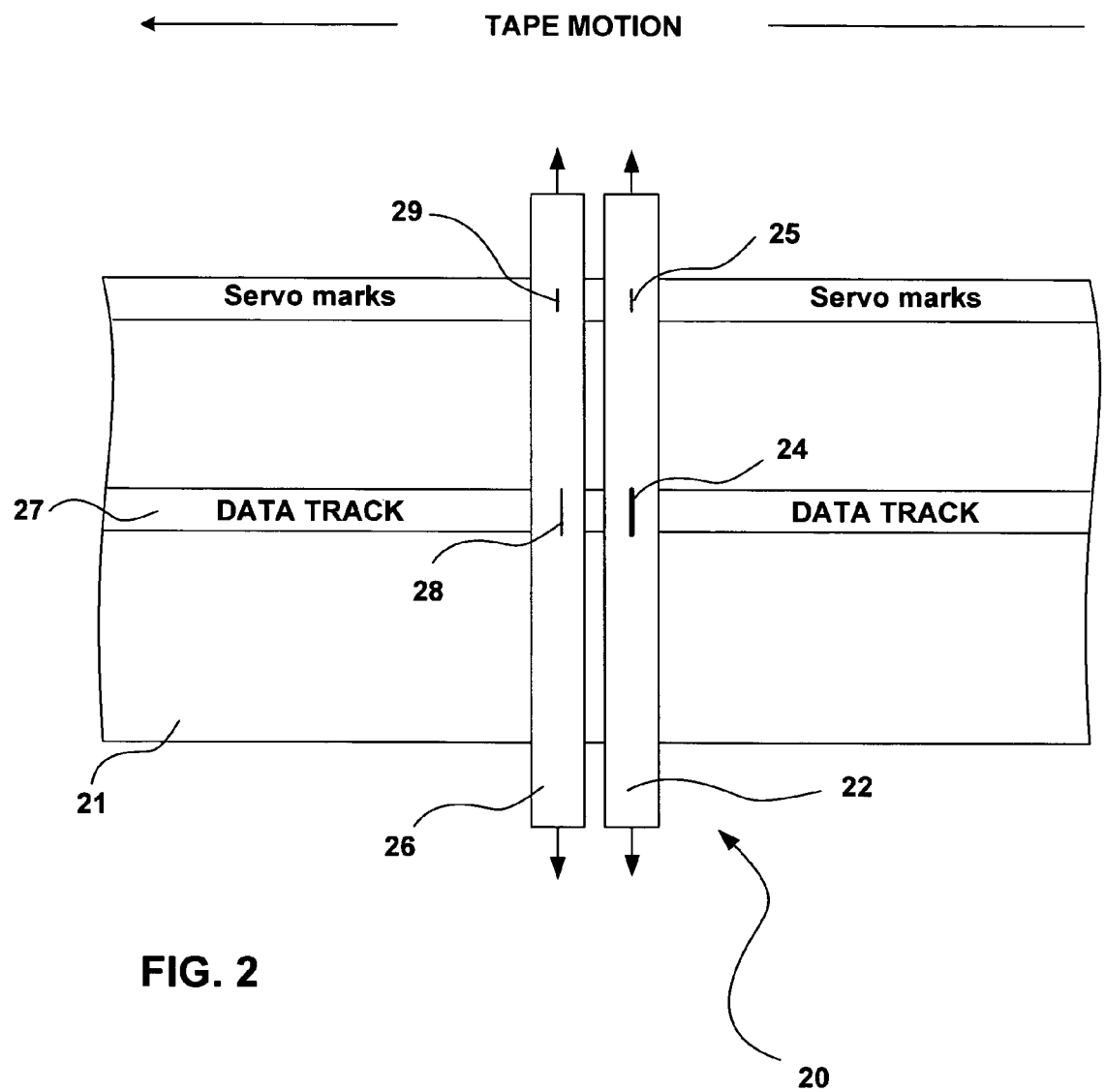
FIG. 2 is a conceptual diagram illustrating a read-while-write system that includes separate sliders for read elements and the write elements.

FIG. 2 is a conceptual diagram illustrating a read-while-write system 20 that includes separate sliders for read elements and write elements, in accordance with an embodiment of the invention. In particular, a first slider 22 includes a write element 24 and a servo element 25, whereas a second slider 26 includes a read element 28 and a servo element 29. As illustrated, as magnetic tape 21 moves past sliders 22, 26 from right-to-left, write element 24 writes data into data track 27 of magnetic tape 21, e.g., as magnetic transitions. Read element 28 of second slider 26 reads the data written by write element 24 in order to verify the accuracy and integrity of the data. If data is not properly recorded, read element 28 can detect the inaccurate data and write element 24 can re-write the data again, e.g., at another location along medium 14. In this manner, system 20 provides read-while-write functionality.

First slider 22 and second slider 26 are separately controllable by different actuators (not shown in FIG. 2). In particular, first slider 22 can be controlled in response to servo signals detected by servo element 25 whereas second slider 26 can be controlled in response to servo signals detected by servo element 29. Such separate control of the positioning of write element 24 and read element 28 can improve head to track alignment. In particular, with separate positioning control, write element 24 and read element 28 can be positioned more accurately with respect to data track 27. Separate positioning control can also simplify the creation of a read-while-write system by avoiding the need to precisely align read heads with write heads on a given slider, as is the case for system 10 of FIG. 1.

In general, read element 28 and write element 24 may comprise magnetic heads that define magnetic gaps for readout or recording, respectively. A wide variety of such heads have been developed for such read and/or write functionality, including magneto-resistive (MR) heads, giant magneto-resistive (gMR) heads, inductive heads, thin film heads, C-core heads that include an excitation coil around the C-core, and a wide variety of other types of heads. In general, a write element refers to an element or head that can write data, and a read element refers to an element or head that can read data written by the write element, e.g., for verification. Some heads can both read and write data and could be used as either a read element or a write element, while other types of heads are only suited for reading or writing. A servo element is a more specific type of read element, designed specifically to read servo marks, e.g., of a time-based or amplitude-based servo pattern.

Figure 3:
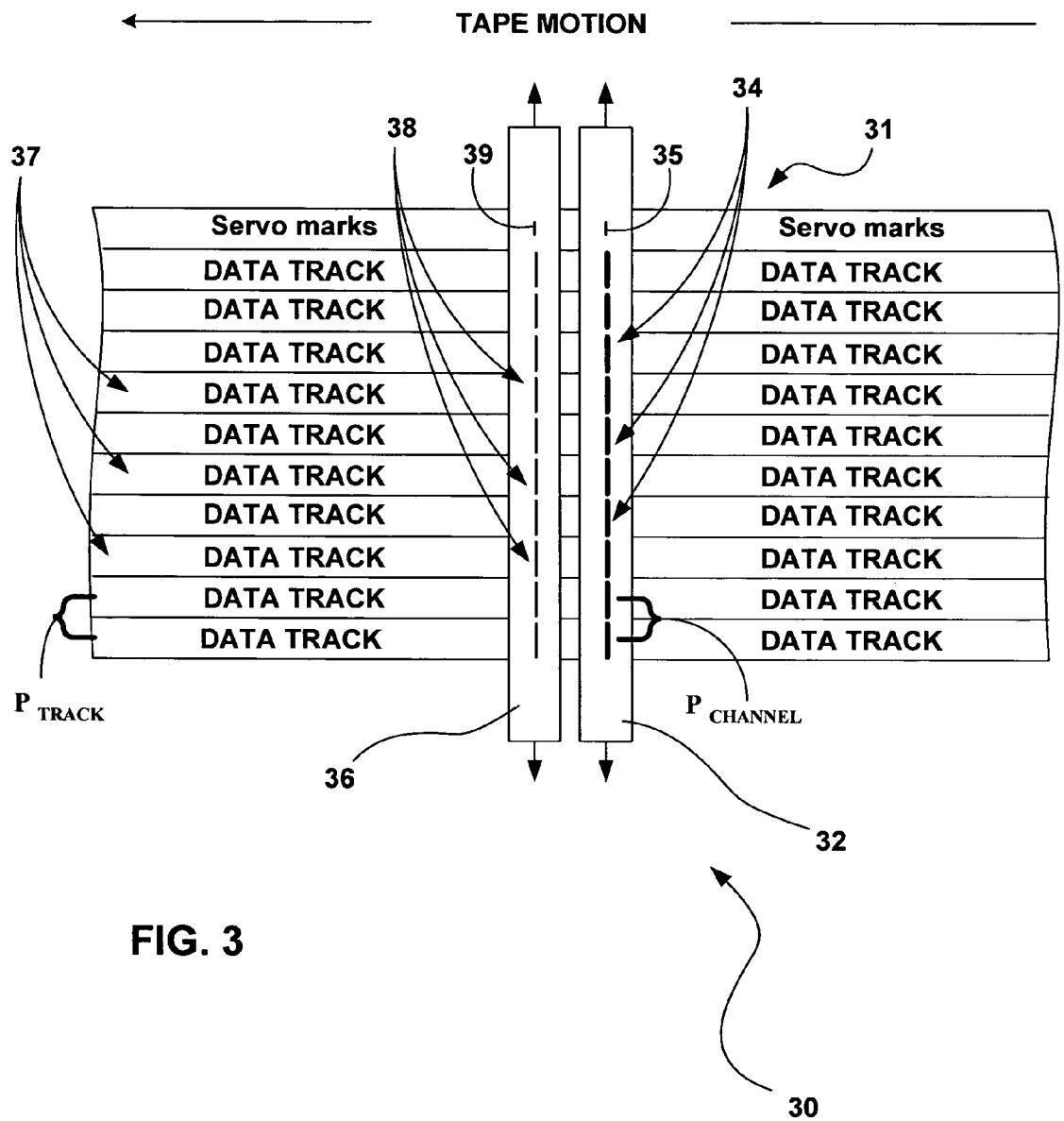
FIG. 3 is another conceptual diagram illustrating a read-while-write system that includes separate sliders for a plurality of read elements and a plurality of write elements.

FIG. 3 is another conceptual diagram illustrating a read-while-write system 30 that includes separate sliders for a plurality of read elements and a plurality of write elements. In particular, a first slider 32 includes a plurality of write elements 34 and a servo element 35, whereas a second slider 36 includes a plurality of read elements 38 and a servo element 39. As magnetic tape 31 moves past sliders 32, 36 from right-to-left, write elements 34 write data into data tracks 37 of magnetic tape 31, e.g., as magnetic transitions. Read elements 38 of second slider 36 read the data written by write elements 34 in order to verify the accuracy and integrity of the data. If data is not properly recorded, one of read elements 38 can detect the inaccurate data and the corresponding one of write elements 34 can re-write the data again. In this manner, system 30 provides read-while-write functionality. Read-while-write functionality generally refers to the read-out verification of data as it is written. The described invention facilitates such read-while-write functionality at unconventionally small track pitches.

In the embodiment of FIG. 3, each of read elements 38 of slider 36 corresponds to one of write elements 34 of slider 32. In this manner, the read and write elements define pairs that correspond to each of data tracks 37. The distance between adjacent read elements 38 or adjacent write elements 34 defines the channel pitch of system 30. The channel pitch is labeled "$P_{CHANNEL}$" in FIG. 3. The distance between adjacent tracks 37 of magnetic tape 31 is referred to as the track pitch of medium 31. The track pitch is labeled "$P_{TRACK}$" in FIG. 3. The track pitch and channel pitch are generally identical.

First slider 32 and second slider 36 are separately controllable by different actuators (not shown in FIG. 3). In particular, first slider 32 can be controlled in response to servo signals detected by servo element 35, whereas second slider 36 can be controlled in response to servo signals detected by servo element 39. Such separate control of the positioning of write elements 34 and read elements 38 can improve head to track alignment. In particular, with separate positioning control, write elements 34 and read element 38 can be positioned more accurately with respect to data tracks 37. As mentioned, separate positioning control can also simplify the creation of a read-while-write system by avoiding the need to precisely align read heads with write heads on a given slider, as is the case for system 10 of FIG. 1. For very small data tracks, e.g., track pitches less than 5 micron, less than 2 microns, and particularly less than 1 micron, the use of separate positioning control becomes very important. At these track pitches, element alignment as shown in FIG. 1 becomes difficult or impossible, particularly for sliders being mass produced. In accordance with the invention, the channel pitch ($P_{CHANNEL}$) may be less than 5 microns, less than 2 microns, or less than 1 micron.

Figure 4:
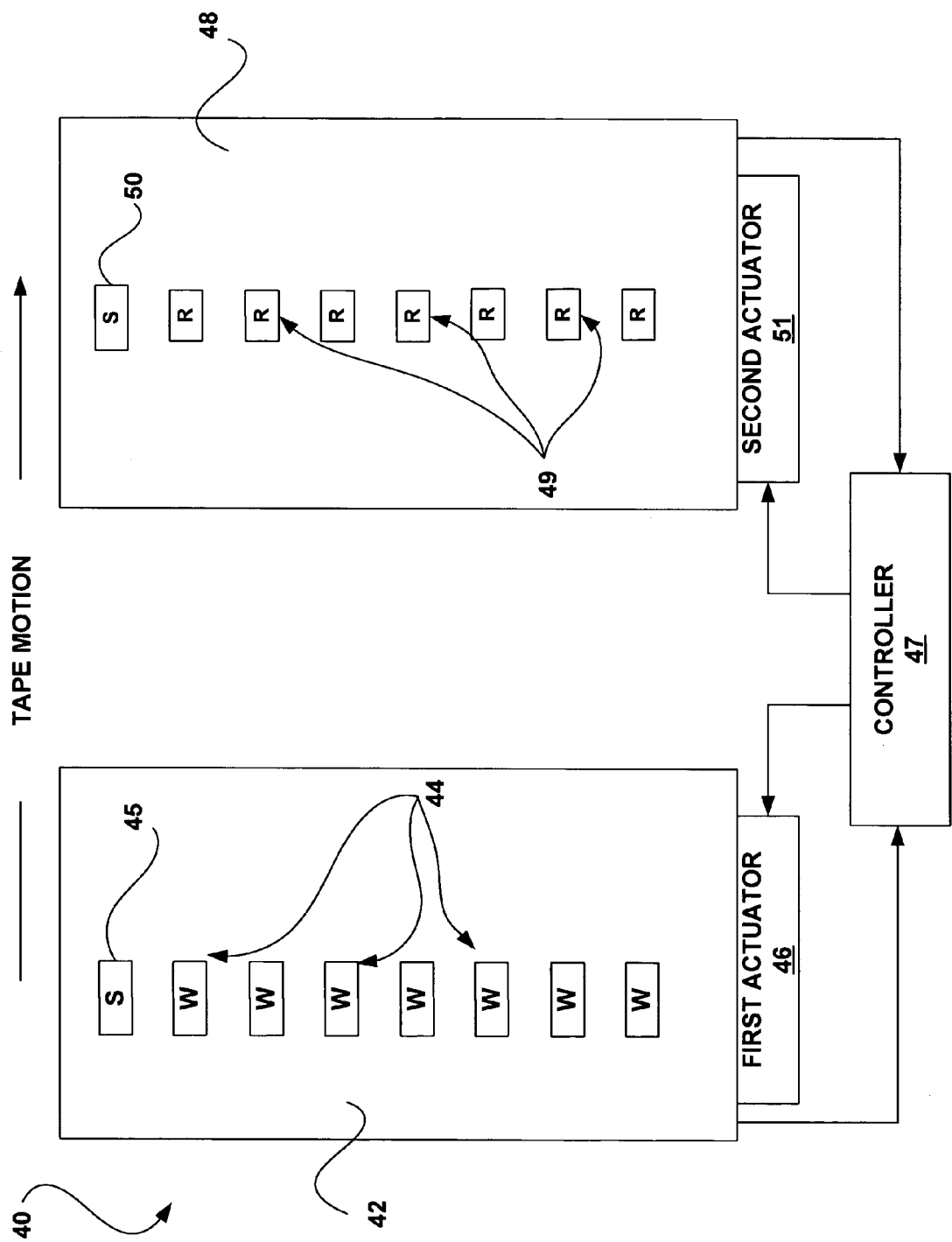
FIGS. 4–6 are block diagrams illustrating various read-while-write systems according to embodiments of the invention.

FIG. 4 is a block diagram illustrating a read-while-write system 40 according to an embodiment of the invention. System 40 includes a first slider 42 including one or more write elements 44 to write data to a linear data storage medium, and a servo element 45 to read servo marks from the linear data storage medium. A first actuator 46 defines positioning of first slider 42. Controller 47 may receive detected servo signals from servo element 45 and control first actuator 46 based on the detected servo signals.

System 40 also includes a second slider 48 including one or more read elements 49 to read the data written by the write elements 44 of first slider 42. Second slider 48 also includes a servo element 50 to read the servo marks from the linear data storage medium. A second actuator 51 defines positioning of second slider 48. Controller 47 may receive detected servo signals from servo element 50 and control second actuator 51 based on such servo signals. In this manner, sliders 42 and 48 are independently controlled based on servo signals detected by the respective sliders. Again, this avoids problems and limitations of conventional sliders that have write elements and read elements aligned on the slider for each channel.

Read element 49 and write elements 44 may comprise magnetic heads that define magnetic gaps for readout or recording, respectively. A wide variety of such heads have been developed for read and/or write functionality, including magneto-resistive (MR) heads, giant magneto-resistive (gMR) heads, inductive heads, thin film heads, C-core heads that include an excitation coil around the C-core, and a wide variety of other types of heads. Servo elements 45 and 50 may comprise similar magnetic heads, but are sized and/or patterned with gaps specific for servo detection. The size and shape of magnetic gaps used for servo elements 45, 50 will depend on the type of servo pattern used for the medium. A wide variety of time based and amplitude-based servo patterns have been developed, and each pattern defines a specific head structure used for servo readout.

The actuators described herein may be any type of actuators, including voice coil actuators, piezoelectric actuators, or any other positioning element. In some cases, each actuator may include both fine and coarse positioning elements, e.g., a stepper motor for coarse positioning and a voice coil for fine positioning. In still other embodiments, a common coarse positioning element may be used for both sliders 42 and 48, with different fine positioning elements being used for the different sliders 42 and 48. In that case, actuators 46 and 51 may be the fine positioning elements for the respective sliders that share a coarse positioning element.

Figure 5:
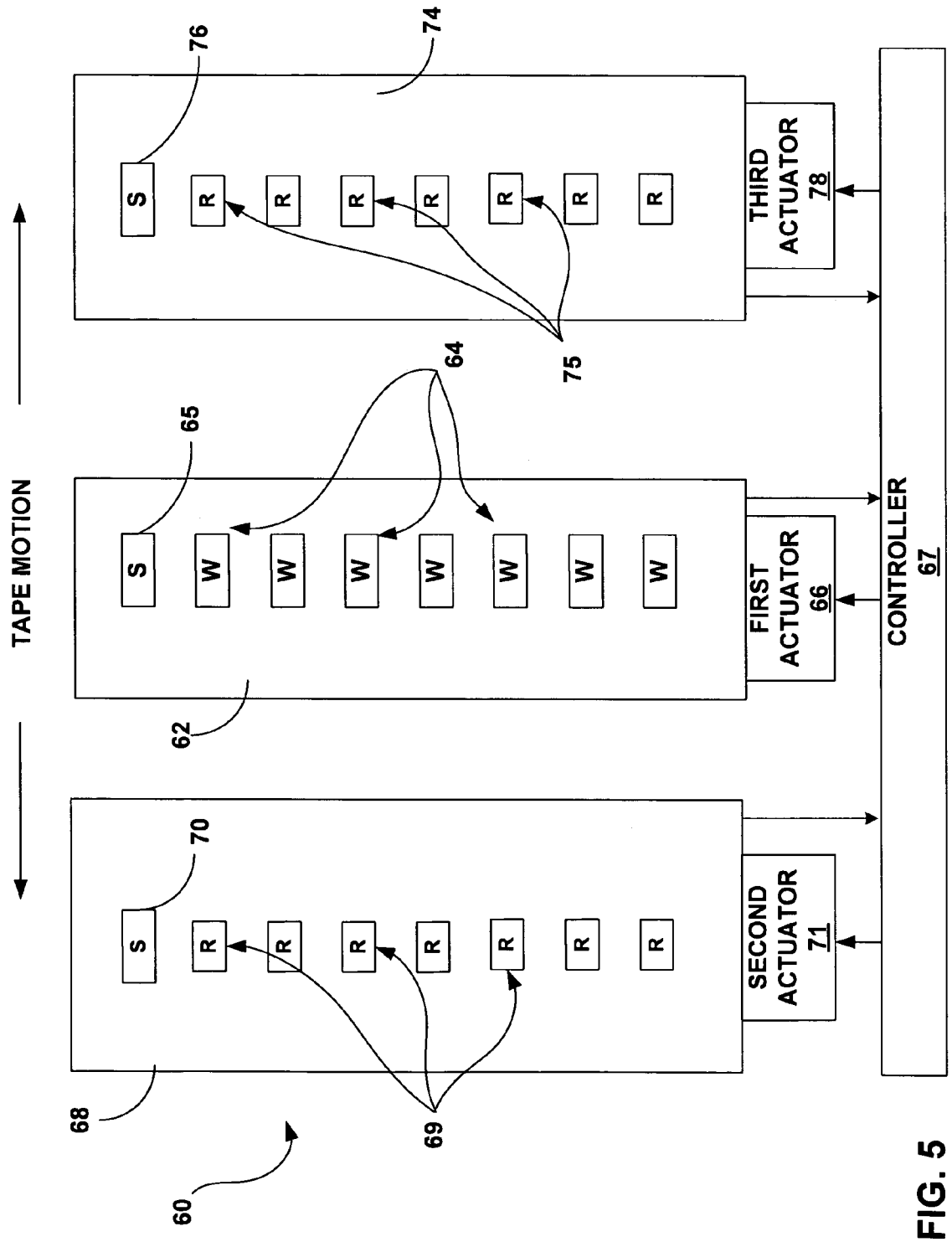

FIG. 5 is a block diagram illustrating a bi-directional read-while-write system 60 according to an embodiment of the invention. System 60 is similar to system 40 of FIG. 4, but includes an additional slider having read elements.

System 60 includes a first slider 62 including one or more write elements 64 to write data to a linear data storage medium, and a servo element 65 to read servo marks from the linear data storage medium. A first actuator 66 defines positioning of first slider 62. Controller 67 may receive detected servo signals from servo element 65 and control first actuator 66 based on such servo signals.

System 60 also includes a second slider 68 including one or more read elements 69 to read the data written by the write elements 64 of first slider 62 when the magnetic tape moves right-to-left. Second slider 68 also includes a servo element 70 to read the servo marks from the linear data storage medium. A second actuator 71 defines positioning of second slider 68. Controller 67 may receive detected servo signals from servo element 69 and control second actuator 71 based on such servo signals. In this manner, sliders 62 and 68 are independently controlled based on servo signals detected by the respective sliders. Again, this avoids problems and limitations of conventional sliders that have write elements and read elements aligned for each channel.

System 60 also includes a third slider 74 including one or more read elements 75 to read the data written by the write elements 64 of first slider 62 when the magnetic tape moves left-to-right. Third slider 74 also includes a servo element 76 to read the servo marks from the linear data storage medium, providing for independent servo control of third slider 74. A third actuator 78 defines positioning of third slider 74. Controller 67 may receive detected servo signals from servo element 75 and control third actuator 78 based on such servo signals.

In the embodiment of FIG. 5, write elements 64 of first slider 62 can be used to write data in both directions. Read elements 69 of second slider 68 read and verify data in a first tape direction, whereas read elements 75 of third slider 74 read and verify data in a second tape direction. In this manner, system 60 allows for bi-directional read-while-write functionality with improved head-to-track positioning.

Figure 6:
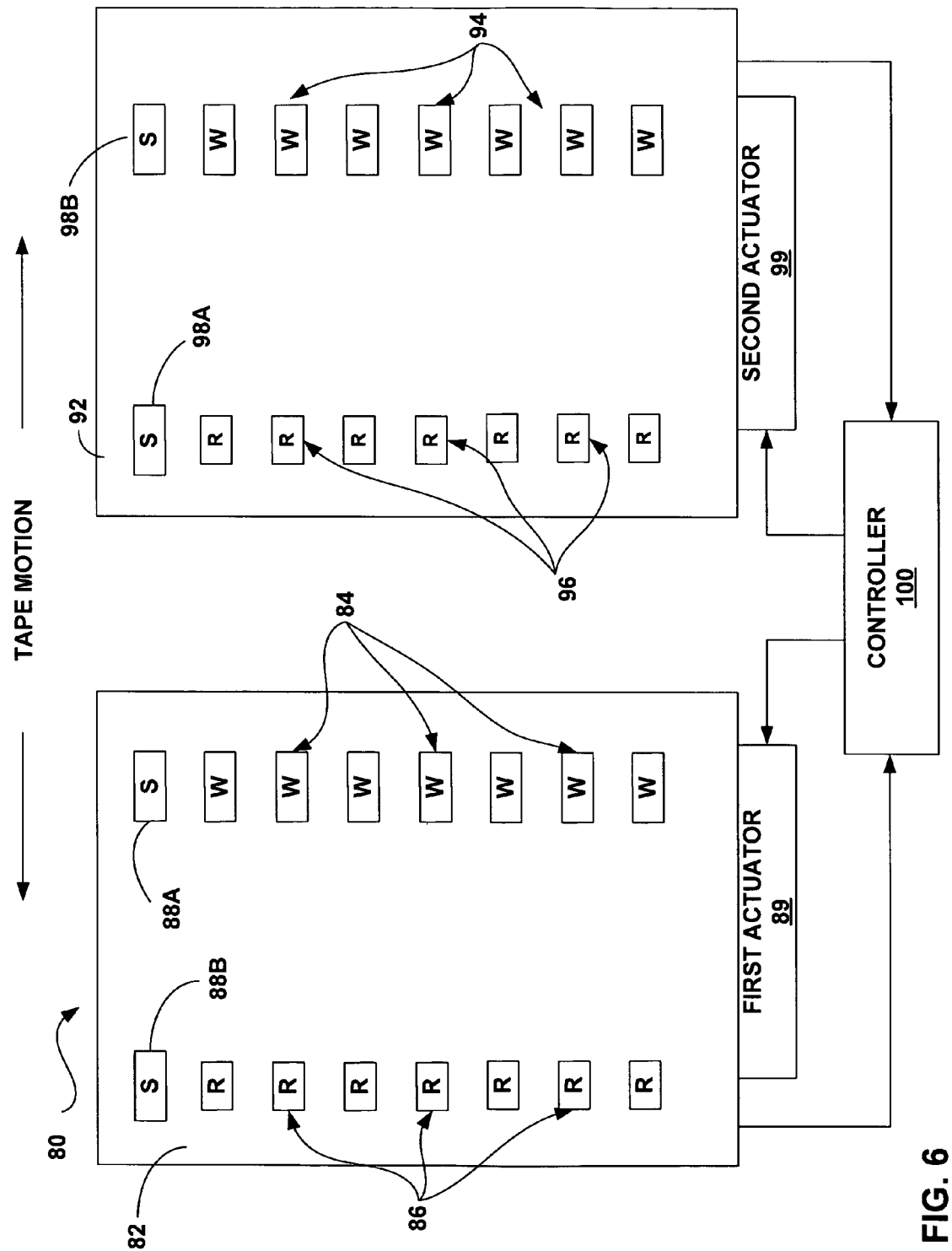

FIG. 6 is a diagram illustrating another read-while-write system according to an embodiment of the invention. System 80 of FIG. 6 includes a first slider 82 including one or more first write elements 84 to write data to the magnetic tape in a first tape direction, one or more first read elements 86 to read data from the magnetic tape in a second tape direction, and a first servo element 88A to read servo marks from the magnetic tape. System 80 also includes a first actuator 89 to define positioning of first slider 80. In the embodiment of FIG. 6, servo elements 88A and 88B are illustrated, although only one servo element is actually needed for a given slider. Either of servo elements 88A, 88B or both of servo elements 88A, 88B could be used.

System 80 also includes a second slider 92 including one or more second write elements 94 to write data to the magnetic tape in the second tape direction, one or more second read elements 96 to read data from the magnetic tape in the first tape direction, and a second servo element 98A to read servo marks from the magnetic tape. System 80 also includes a second actuator 99 to define positioning of second slider 92. In the illustrated embodiment, servo elements 98A and 98B are shown, although only one servo element is actually needed for slider 92. Either or both of servo elements 98A could be used.

In accordance with the invention, first actuator 89 positions first slider 82 in response to servo signals detected by first servo element 88A. Similarly, second actuator 99 positions second slider 92 in response to servo signals detected by second servo element 98A. However, in a first tape direction, write elements 84 of first slider 82 are used in conjunction with the read elements 96 of second slider 92 for read-while-write verification. In particularly, read elements 96 of second slider 92 provide verification of data recorded by write elements 84 of first slider 82. Similarly, in a second tape direction, write elements 94 of second slider 92 are used in conjunction with the read elements 86 of first slider 82 for read-while-write verification. Accordingly, the read and write elements used during any given operation are independently controlled by different actuators, e.g., in response to different servo signals. Controller 100 receives servo signals detected by one of the servo elements of first slider 82 and second slider 92, and sends appropriate control signals to actuators 89, 99 to properly position the heads for read-while-write operations.

As described herein, because the read and write elements used during any given operation are independently controlled by different actuators, improved track pitch and channel pitch can be facilitated, e.g., less than 5 microns, less than 2 microns, or even less than 1 micron. Moreover, the system of FIG. 6 provides additional advantages in terms of slider fabrication. Sliders 82 and 92 may be fabricated in a manner similar to conventional sliders, such as slider 12 of FIG. 1. Many distinct fabrication advantages can be realized by using conventional sliders. However, in contrast to conventional systems, system 80 of FIG. 6 makes use of two sliders, and a given set of write elements of a given slider are not used with the read elements of that slider. Instead, the write elements 84 of first slider 82 are used in conjunction with the read elements 96 of second slider 92 in a first tape direction for read-while-write operation, whereas the write elements 94 of second slider 92 are used in conjunction with the read elements 86 of first slider 82 for read-while-write verification in a second tape direction.

Figure 7:
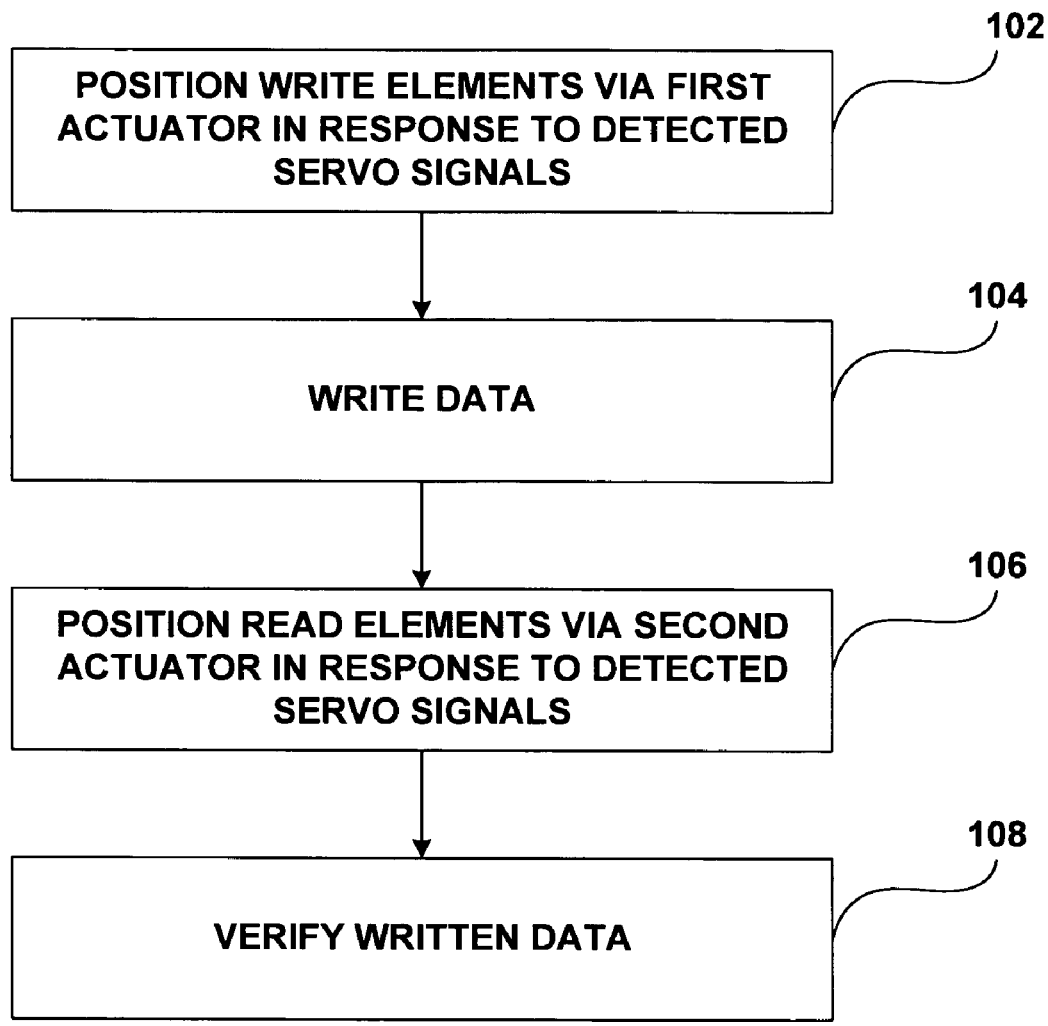
FIG. 7 is a flow diagram illustrating a technique according to an embodiment of the invention.

FIG. 7 is a flow diagram illustrating a technique according to an embodiment of the invention. FIG. 7 will be described with reference to system 80 of FIG. 6. As shown, controller 100 positions write elements 84 via first actuator 89 in response to servo signals detected by servo element 88A and/or 88B (102). Write elements 84 can then properly write data to data tracks of the data storage media passing slider 82 (104). Controller 100 also positions read elements 96 via actuator 99 in response to servo signals detected by servo element 98A and/or 98B (106). Read elements 96 can then properly read data written to the data tracks of the data storage media (108). In this manner, separate actuators can be used to position write heads and read heads for read-while-write operations. A similar technique is performed for the opposite tape direction, but read elements 86 of slider 82 are used in conjunction with write elements 94 of slider 92.

A number of embodiments of the invention have been described. For example, various embodiments of read-while-write recording systems for a linear data storage medium have been described. These and other embodiments are within the scope of the following claims.

The invention claimed is:

1. A read-while-write recording system for a linear data storage medium comprising:
   a first slider including a write element to write data to the linear data storage medium and a first servo element to read servo marks from the linear data storage medium;
   a first actuator to define positioning of the first slider, wherein the first actuator includes fine and coarse positioning elements;
   a second slider including a read element to read the data written by the write element, and a second servo element to read, the servo marks from the linear data storage medium; and
   a second actuator to define positioning of the second slider, wherein the second actuator includes fine and coarse positioning elements.

2. The system of claim 1, wherein the first actuator positions the first slider in response to servo signals detected by the first servo element and the second actuator positions the second slider in response to servo signals detected by the second servo element.

3. The system of claim 2, further comprising a controller to receive the servo signals detected by the first and second servo elements and to control the actuators based on the servo signals.

4. The system of claim 1, wherein a track pitch of the linear data storage medium is less than approximately 5 microns.

5. The system of claim 4, wherein a track pitch of the linear data storage medium is less than approximately 2 microns.

6. The system of claim 5, wherein a track pitch of the linear data storage medium is less than approximately 1 micron.

7. The system of claim 1, further comprising:
a third slider including a read element to read the data written by the write element and a third servo element to read the servo marks from the linear data storage medium; and
a third actuator to define positioning of the third slider, wherein the write element of the first slider and the read element of the second slider perform read-while-write functions in a first tape direction and the write element of the first slider and the read element of the third slider perform read-while-write functions in a second tape direction.

8. The system of claim 1, wherein:
the first slider includes a plurality of write elements; and
the second slider includes a plurality of read elements.

9. The system of claim 8, wherein a number of write elements of the first slider corresponds to a number of read elements of the second slider such that the read elements verify data written by the write elements.

10. The system of claim 8, wherein adjacent write elements on the first slider define a channel pitch and adjacent read elements of the second slider are spaced from one another according to the channel pitch.

11. The system of claim 8, wherein the channel pitch is less than approximately 5 microns.

12. The system of claim 11, wherein the channel pitch is less than approximately 2 microns.

13. The system of claim 12, wherein the channel pitch is less than approximately 1 micron.

14. The system of claim 1, wherein the linear data storage medium comprises magnetic data storage tape.

15. A read-while-write recording system for magnetic data storage tape comprising:
a first slider including a first write element to write data to the magnetic tape in a first tape direction, a first read element to read data from the magnetic tape in a second tape direction, and a first servo element to read servo marks from the magnetic tape, wherein the first read element and the first write element are substantially aligned within the first slider along a direction of tape motion and the first servo element is not substantially aligned with the first read element and the first write element along the direction of tape motion;
a first actuator to define positioning of the first slider;
a second slider including a second write element to write data to the magnetic tape in the second tape direction, a second read element to read data from the magnetic tape in the first tape direction, and a second servo element to read servo marks from the magnetic tape, wherein the second read element and the second write element are substantially aligned within the second slider along the direction of tape motion and the second servo element is not substantially aligned with the second read element and the second write element along the direction of tape motion; and
a second actuator to define positioning of the second slider.

16. The system of claim 15, wherein the first actuator positions of the first slider in response to servo signals detected by the first servo element and the second actuator positions of the second slider in response to servo signals detected by the second servo element, wherein the first and second actuators each include fine and coarse positioning elements.

17. The system of claim 15, wherein the first and second sliders each include a plurality of write elements and a plurality of read elements substantially aligned along the direction of tape motion.

18. The system of claim 17, wherein a channel pitch of the plurality of write elements on the first and second sliders and the plurality of read elements on the first and second sliders is less than approximately 2 microns.

19. The system of claim 15, wherein a track pitch of the magnetic tape is less than approximately 2 microns.

20. A method comprising:
writing data on a linear data storage medium via a write element on a first slider;
verifying the data on the linear data storage medium via a read element on a second slider;
positioning the write element of the first slider via a first actuator in response to servo signals detected by a first servo element on the first slider, wherein the first actuator includes fine and coarse positioning elements; and
positioning the wad element of the second slider via a second actuator in response to servo signals detected by a second servo element on the second slider, wherein the second actuator includes fine and coarse positioning elements.

* * * * *

UNITED STATES PATENT AND TRADEMARK OFFICE
CERTIFICATE OF CORRECTION

| | |
|---|---|
| PATENT NO. | : 7,054,093 B1 |
| APPLICATION NO. | : 11/012795 |
| DATED | : May 30, 2006 |
| INVENTOR(S) | : James S. Anderson and Denis J. Langlois |

It is certified that error appears in the above-identified patent and that said Letters Patent is hereby corrected as shown below:

Column 8
   Line 47, "read, the servo marks" should read --read the servo marks--.

Column 10
   Line 41, "wad" should read --read--.

Signed and Sealed this

First Day of May, 2007

JON W. DUDAS
*Director of the United States Patent and Trademark Office*